(12) United States Patent
Todasco (10) Patent No.: US 10,373,169 B2
(45) Date of Patent: Aug. 6, 2019

(54) ENHANCING INFORMATION SECURITY VIA THE USE OF A DUMMY CREDIT CARD NUMBER

(71) Applicant: PAYPAL, INC., San Jose, CA (US)

(72) Inventor: Michael Charles Todasco, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 877 days.

(21) Appl. No.: 14/823,156

(22) Filed: Aug. 11, 2015

(65) Prior Publication Data

US 2017/0046712 A1    Feb. 16, 2017

(51) Int. Cl.
| | | |
|---|---|---|
| *G06F 21/62* | (2013.01) | |
| *G06Q 20/32* | (2012.01) | |
| *G06Q 20/40* | (2012.01) | |
| *H04L 29/06* | (2006.01) | |

(52) U.S. Cl.
CPC ..... *G06Q 20/4097* (2013.01); *G06Q 20/3224* (2013.01); *G06Q 20/40145* (2013.01); *H04L 63/0414* (2013.01); *H04L 63/0876* (2013.01); *H04L 63/107* (2013.01); *H04L 63/126* (2013.01); *G06F 21/62* (2013.01); *H04L 2463/102* (2013.01)

(58) Field of Classification Search
CPC .................................................... H04W 12/06
See application file for complete search history.

(56) References Cited

U.S. PATENT DOCUMENTS

| | | | | |
|---|---|---|---|---|
| 9,922,319 | B2 * | 3/2018 | Kobayashi | G06Q 20/24 |
| 2001/0029485 | A1 * | 10/2001 | Brody | G06Q 20/00 |
| | | | | 705/39 |
| 2002/0026416 | A1 * | 2/2002 | Provinse | G06Q 10/02 |
| | | | | 705/39 |
| 2004/0039694 | A1 * | 2/2004 | Dunn | G06Q 20/04 |
| | | | | 705/39 |

(Continued)

FOREIGN PATENT DOCUMENTS

| | | | | |
|---|---|---|---|---|
| CA | 2363220 A1 * | 5/2003 | | G06Q 20/12 |
| WO | WO-2011056156 A1 * | 5/2011 | | G06Q 20/12 |
| WO | WO-2014020619 A1 * | 2/2014 | | G06F 21/33 |

OTHER PUBLICATIONS

Dana Dratch, 6 things to know about virtual credit card numbers, 2011, Creditcards.com (Year: 2011).*

*Primary Examiner* — Chikaodinaka Ojiaku
(74) *Attorney, Agent, or Firm* — Haynes and Boone, LLP (57) ABSTRACT

The present disclosure is directed to enhancing electronic information security. An electronic device is registered in a registration process. The registration process of the electronic device includes at least one of: obtaining a device identifier that is unique to the electronic device and storing the device identifier as a registered device identifier; or obtaining a location of the electronic device via Global Positioning System (GPS) and storing the location as a registered location of the electronic device. A dummy credit card number is generated. After the registration process and after the dummy credit card number is generated, a request to conduct a transaction electronically is received. The request contains the dummy credit card number. A determination is made as to whether the request was sent from the registered electronic device. The request is processed if the request has been determined to come from the registered electronic device.

20 Claims, 8 Drawing Sheets

(56) References Cited

U.S. PATENT DOCUMENTS

| | | | |
|---|---|---|---|
| 2009/0063334 A1* | 3/2009 | Duncan | G06Q 20/10 705/39 |
| 2010/0082487 A1* | 4/2010 | Nelsen | G06Q 20/10 705/44 |
| 2011/0153498 A1* | 6/2011 | Makhotin | G06Q 20/10 705/44 |
| 2011/0251892 A1* | 10/2011 | Laracey | G06Q 30/0253 705/14.51 |
| 2012/0030002 A1* | 2/2012 | Bous | G06Q 30/02 705/14.36 |
| 2012/0203698 A1* | 8/2012 | Duncan | G06Q 20/34 705/44 |
| 2012/0278188 A1* | 11/2012 | Attar | G06Q 20/3276 705/17 |
| 2013/0227312 A1* | 8/2013 | Sakai | G06F 1/263 713/300 |
| 2013/0297509 A1* | 11/2013 | Sebastian | G06Q 20/3226 705/44 |
| 2014/0081870 A1* | 3/2014 | de Sylva | G06Q 20/40145 705/44 |
| 2014/0129422 A1* | 5/2014 | Zhou | G06Q 20/3274 705/38 |
| 2014/0143037 A1* | 5/2014 | Zhou | G06Q 30/0226 705/14.17 |
| 2014/0214500 A1* | 7/2014 | Hudson | G06Q 30/0284 705/13 |
| 2014/0229339 A1* | 8/2014 | Massiere | G06Q 20/3229 705/26.81 |
| 2014/0239065 A1* | 8/2014 | Zhou | G06F 1/163 235/380 |
| 2015/0149365 A1* | 5/2015 | Mobini | G06Q 20/382 705/75 |
| 2015/0186874 A1* | 7/2015 | Govindarajan | G06Q 20/382 705/65 |
| 2015/0324766 A1* | 11/2015 | Park | G06Q 20/3572 705/39 |
| 2015/0379283 A1* | 12/2015 | Spodak | G05B 1/01 705/51 |

\* cited by examiner

| | 210 | | | Please enter your credit card information: |
| --- | --- | --- | --- | --- |
| | Products | Price | Quantity | Card type |
| | Product A | $10.00 | 2 | VISA<br>• MASTERCARD<br>AMERICAN EXPRESS<br>DISCOVER |
| | Product B | $20.00 | 3 | |
| | Product C | $15.00 | 4 | Card Number<br>1234567812345678 |
| | Product D | $30.00 | 1 | Expiration Date<br>7/20/15 |
| | Total | $170.00 | | 3-digit CVV code<br>111 |

Enter the amount of the transaction: $170

Select the how long you want the dummy credit card number to be available: 24 hours A one-time dummy credit card number is generated below:

ENHANCING INFORMATION SECURITY VIA THE USE OF A DUMMY CREDIT CARD NUMBER

BACKGROUND

Field of the Invention

The present invention generally relates to systems and methods for enhancing electronic information security.

Related Art

Online transactions are becoming more and more prevalent, with an ever-increasing number of online entities that may or may not have a physical real world counterpart. Furthermore, the services offered by these online entities have been improving as well. The popularity of online transactions is partially attributable to the ease and convenience of making a transaction online instead of at a physical location. With more and more transactions being conducted online, electronic information security has become a significant concern. For example, a consumer shopping at an online retailer may not feel comfortable giving out his or her credit card number, since that credit card number could possibly be intercepted or otherwise stolen by hackers. Existing electronic information security schemes have not sufficiently addressed this concern of consumers. In addition, often times credit card numbers are a string of random digits, which may be difficult for a consumer to remember. If a consumer cannot easily remember his or her credit card number, he or she would have to get the credit card out of the wallet every time a transaction involving a credit card is made. This is inconvenient for the consumer.

Therefore, although existing systems and methods of providing electronic information security are generally adequate for their intended purposes, they have not been entirely satisfactory in every aspect. What is needed is an enhanced electronic information security scheme that allows a consumer to conduct legitimate electronic transactions via dummy credit card numbers, which may also be easy for the consumer to remember.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

Online transactions are becoming more and more prevalent, with an ever-increasing number of online entities that may or may not have a physical real world counterpart. Furthermore, the services offered by these online entities have been improving as well. The popularity of online transactions is partially attributable to the ease and convenience of making a transaction online instead of at a physical location. Unfortunately, the popularity of online transactions has also led to an increase in online fraud activities. For example, hackers have hacked into victims' accounts at various retailers or merchants, which in many cases led to stolen credit card numbers and fraudulent purchases. Due to these security breaches, consumers may be hesitant to provide their credit card numbers to complete an online transaction, since they know that the credit card numbers could be illegally intercepted. In other cases, consumers may simply not remember his/her credit card number, since it usually is a long number consisting of meaningless digits. Therefore, even if the consumer is willing to provide his/her credit card number in association with an online transaction, he/she has to get the actual credit card out of the wallet and enter the credit card number online, which is inconvenient.

To enhance the information security associated with online transactions, and to improve the consumer's shopping experience, the present disclosure allows consumers to conduct online transactions using dummy or fake credit card numbers, as discussed in more detail with reference to FIGS. 1-11.

Figure 1:
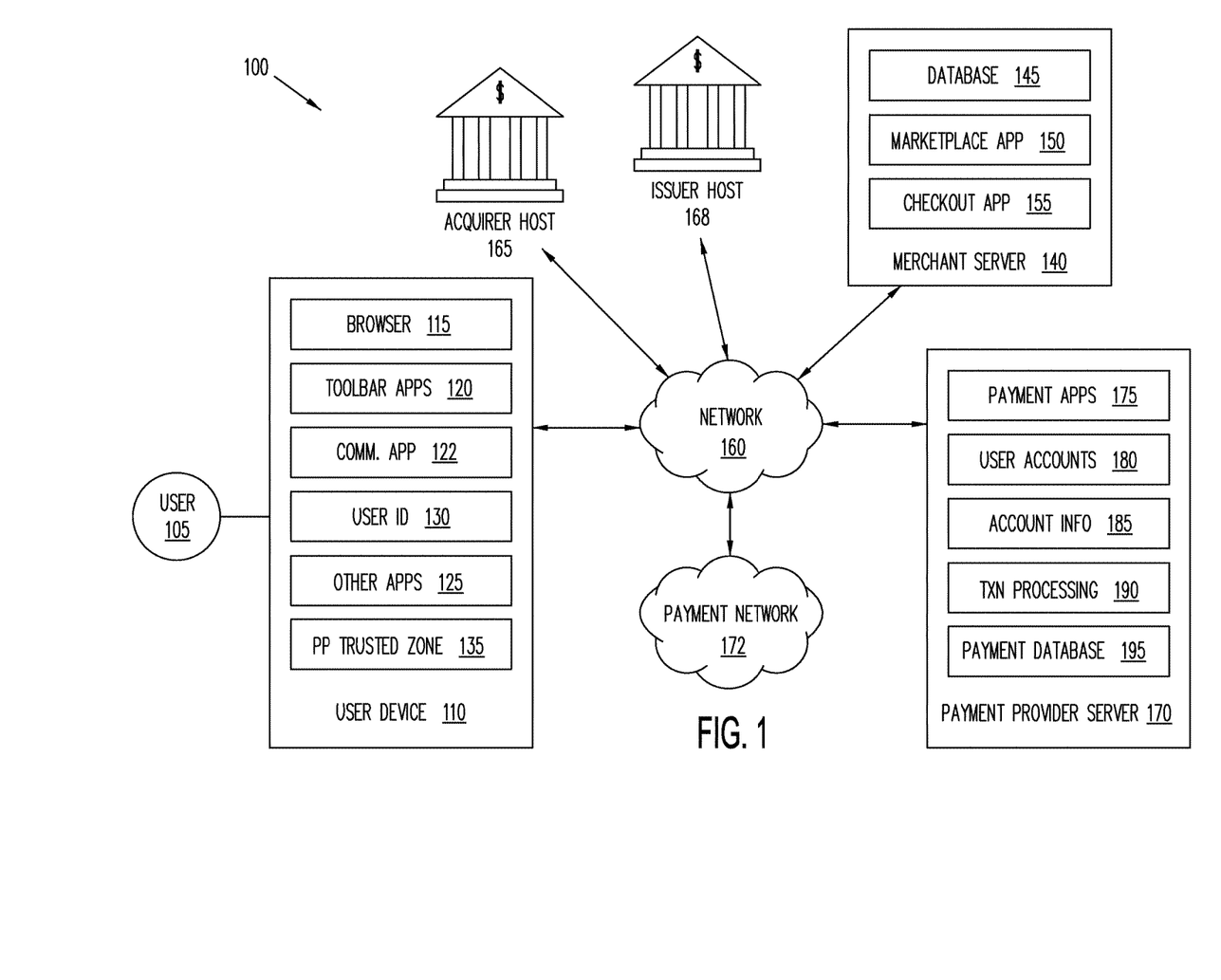
FIG. 1 is block diagram of a networked architecture suitable for conducting electronic online transactions according to embodiments of the present disclosure.

FIG. 1 is block diagram of a networked system or architecture suitable for conducting electronic online transactions according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

The system 100 may include a user device 110, a merchant server 140, a payment provider server 170, an acquirer host 165, an issuer host 168, and a payment network 172 that are in communication with one another over a network 160. Payment provider server 170 may be maintained by a payment service provider, such as PayPal, Inc. of San Jose, Calif. A user 105, such as a consumer, may utilize user device 110 to perform an electronic transaction using payment provider server 170. For example, user 105 may utilize user device 110 to visit a merchant's web site provided by merchant server 140 or the merchant's brick-and-mortar store to browse for products offered by the merchant. Further, user 105 may utilize user device 110 to initiate a payment transaction, receive a transaction approval request, or reply to the request. Note that transaction, as used herein, refers to any suitable action performed using the user device, including payments, transfer of information, display of information, etc. Although only one merchant server is shown, a plurality of merchant servers may be utilized if the user is purchasing products from multiple merchants.

User device 110, merchant server 140, payment provider server 170, acquirer host 165, issuer host 168, and payment network 172 may each include one or more electronic processors, electronic memories, and other appropriate electronic components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, the user device may be implemented as a personal computer (PC), a smart phone, a smart phone with additional hardware such as NFC chips, BLE hardware etc, wearable devices with similar hardware configurations such as a gaming device, a Virtual Reality Headset, or that talk to a smart phone with unique hardware configurations and running appropriate software, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for online shopping and/or merchant sites for viewing and purchasing goods and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 also may include other applications to perform functions, such as email, texting, voice and IM applications that allow user 105 to send and receive emails, calls, and texts through network 160, as well as applications that enable the user to communicate, transfer information, make payments, and otherwise utilize a digital wallet through the payment provider as discussed herein.

User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100. In conjunction with user identifiers 130, user device 110 may also include a secure zone 135 owned or provisioned by the payment service provider with agreement from device manufacturer. The secure zone 135 may also be part of a telecommunications provider SIM that is used to store appropriate software by the payment service provider capable of generating secure industry standard payment credentials as a proxy to user payment credentials based on user 105's credentials/status in the payment providers system/age/risk level and other similar parameters.

User device 110 may install and execute a payment application received from the payment service provider to facilitate payment processes. The payment application may allow a user to send payment transaction requests to the payment service provider. In particular, the payment application may authenticate user 105 before making payments. In an embodiment, the payment application may implement automatic authentication of the user 105 when the user 105 is at certain payment locations. The payment application in conjunction with the payment service provider may also provide proxies for user's credentials and funding instruments (e.g., payment and identity proxies for transaction) within secure zone 135 to be used with/without further authentication with payment service provider depending on the transaction or payment situation. The payment application may also receive relevant payment and identity proxies from proximity based ancillary systems such as a Bluetooth beacon installed in the merchant's premises in association with the payment service provider for the purpose of processing transactions or providing value added services to the user.

Merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as retailers and restaurants. For example, a purchase transaction may be payment or gift to an individual. Merchant server 140 may include a database 145 identifying available products and/or services (e.g., collectively referred to as items) which may be made available for viewing and purchase by user 105. Accordingly, merchant server 140 also may include a marketplace application 150 which may be configured to serve information over network 360 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment provider server 170 over network 160. For example, checkout application 155 may receive and process a payment confirmation from payment provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Payment provider server 170 may be maintained, for example, by an online payment service provider which may provide payment between user 105 and the operator of merchant server 140. In this regard, payment provider server 170 may include one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as credit card companies. For example, account information 185 may include private financial information of users of devices such as account numbers, passwords, device identifiers, usernames, phone numbers, credit card information, bank information, or other financial information which may be used to facilitate online transactions by user 105. Account information may also include user purchase history and user ratings. Advantageously, payment application 175 may be configured to interact with merchant server 140 on behalf of user 105 during a transaction with checkout application 155 to track and manage purchases made by users and which and when funding sources are used. In some embodiments, an identity platform may be managed by or be part of a payment provider service, such as payment provider server 170, or be a separate entity or service provider that manages identity.

A transaction processing application 190, which may be part of payment application 175 or separate, may be configured to receive information from a user device and/or merchant server 140 for processing and storage in a payment database 195. Transaction processing application 190 may include one or more applications to process information from user 105 for processing an order and payment using various selected funding instruments, including for initial purchase and payment after purchase as described herein. As such, transaction processing application 190 may store details of an order from individual users, including funding source used, credit options available, etc. Payment application 175 may be further configured to determine the existence of and to manage accounts for user 105, as well as create new accounts if necessary.

In one embodiment, payment provider server 170 may include a token vault storing various information on token formats, conventions, data, and the like. For example, a token may be generated for a user's payment account to allow payment transactions using the token. A user's identity information, preferences, or other information may be stored and associated with the user's account and mapped to tokens. Merchant accounts at the payment provider server 170 also may store merchant's information, such as type of merchant, product or service offered, method of payments, and the like to ensure diversified use of tokens that may vary by merchant type/service etc.

Payment network 172 may be operated by payment card service providers or card associations, such as DISCOVER®, VISA®, MASTERCARD®, AMERICAN EXPRESS®, RuPAY®, China Union Pay®, etc. The payment card service providers may provide services, standards, rules, and/or policies for issuing various payment cards. A network of communication devices, servers, and the like also may be established to relay payment related information among the different parties of a payment transaction.

Issuer host 168 may be a server operated by an issuing bank or issuing organization of payment cards. The issuing banks may enter into agreements with various merchants to accept payments made using the payment cards. The issuing bank may issue a payment card to a user after a card account has been established by the user at the issuing bank. The user then may use the payment card to make payments at various merchants who agreed to accept the payment card.

Acquirer host 165 may be a server operated by an acquiring bank. An acquiring bank is a financial institution that accepts payments on behalf of merchants. For example, a merchant may establish an account at an acquiring bank to receive payments made via various payment cards. When a user presents a payment card as payment to the merchant, the merchant may submit the transaction to the acquiring bank. The acquiring bank may verify the payment card number, the transaction type and the amount with the issuing bank and reserve that amount of the user's credit limit for the merchant. An authorization will generate an approval code, which the merchant stores with the transaction.

Figure 2:
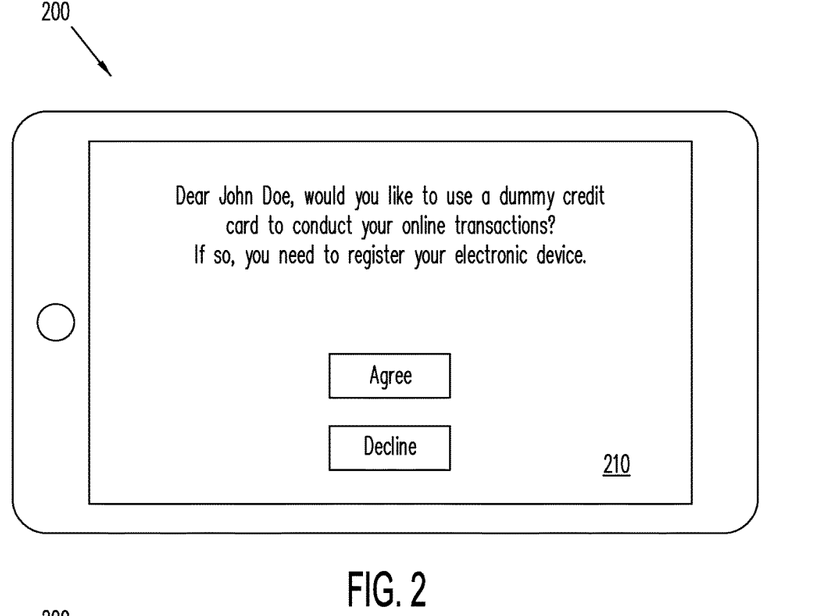
FIGS. 2-8 illustrate example user interfaces of an electronic device used to conduct electronic online transactions according to embodiments of the present disclosure.

FIG. 2 illustrates a device registration process according to embodiments of the present disclosure. In more detail, FIG. 2 illustrates a diagrammatic view of a mobile electronic device 200. The mobile electronic device 200 may be an embodiment of the user device 110 discussed above with reference to FIG. 1. For example, the mobile electronic device 200 may be a smartphone (e.g., an Apple® iPhone®, an Android® phone, or a Windows® phone), a computer tablet (e.g., an Apple® iPad®, an Android® tablet, or a Windows® Surface® tablet), or a laptop or desktop computer. In the embodiment shown, the mobile electronic device 200 includes a touchscreen 210 (e.g., a capacitive touchscreen that responds to a user engagement via a finger or a stylus). A suitable user interface may be displayed via the touchscreen 210, for example the user interface of an app (hereinafter referred to as "the payment provider app") of a payment provider such as PayPal, Inc. of San Jose, Calif.

In FIG. 2, the user interface displayed on the touchscreen 210 informs the user (John Doe) that he may use a dummy or fake credit card to conduct online transactions, but to do so, he needs to register his electronic device. The user interface presents an option for the user to accept or decline the registration request. If the user clicks "Accept", the mobile electronic device 200 will, at least in part via the payment provider app installed on the mobile electronic device 200, extract device-specific information from the mobile electronic device 200. The device-specific information may include device identifiers that can uniquely identify the mobile electronic device 200. For example, the unique device identifiers may include, but are not limited to, a Media Access Control (MAC) address (also known as a Wi-Fi Address), a Bluetooth address, a serial number, a Unique Device Identifier for iPhones®, iPods®, or iPads®, (UDID, which is a 40-digit sequence of letters and numbers that may look like: 0e83ff56a12a9cf0c7290cbb08ab6752181fb54b), a Mobile Equipment Identifier (MEID, which may be in a decimal format or in a hexadecimal format), an International Mobile Station Equipment Identity (IMEI), an Electronic Serial Number (ESN), an Integrated Circuit Card ID (ICCID), an International Mobile Subscriber Identity (IMSI), etc. Given one or more of these device identifiers, the identity of the corresponding mobile electronic device may be quickly verified.

Figure 3:
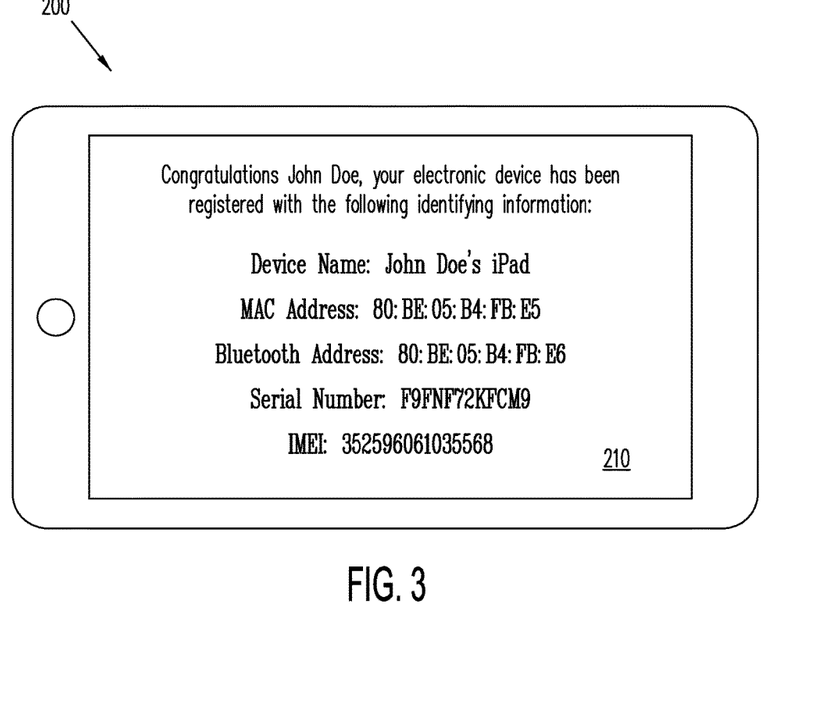

Referring now to FIG. 3, the user John Doe has accepted the registration request, and the user interface may display a list of the identifiers that have been extracted from the mobile electronic device 200 and associated with John Doe's account. In the example shown in FIG. 3, the mobile electronic device 200 has been determined to be an Apple® iPad® and is thus named John Doe's iPad. The device identifiers that have been determined include a MAC address, a Bluetooth address, a serial number, and an IMEI number. These identifiers are stored, in association with the account of the user John Doe, either on a local storage of the mobile electronic device 200 or in a remote server of the payment provider (or both).

It is understood that although the present example shows only one device (e.g., an iPad®) being registered as the approved device, multiple devices can in fact be registered. For example, the user may register an iPad®, an iPhone®, and Android® phone, and a Windows® laptop.

Figure 4:
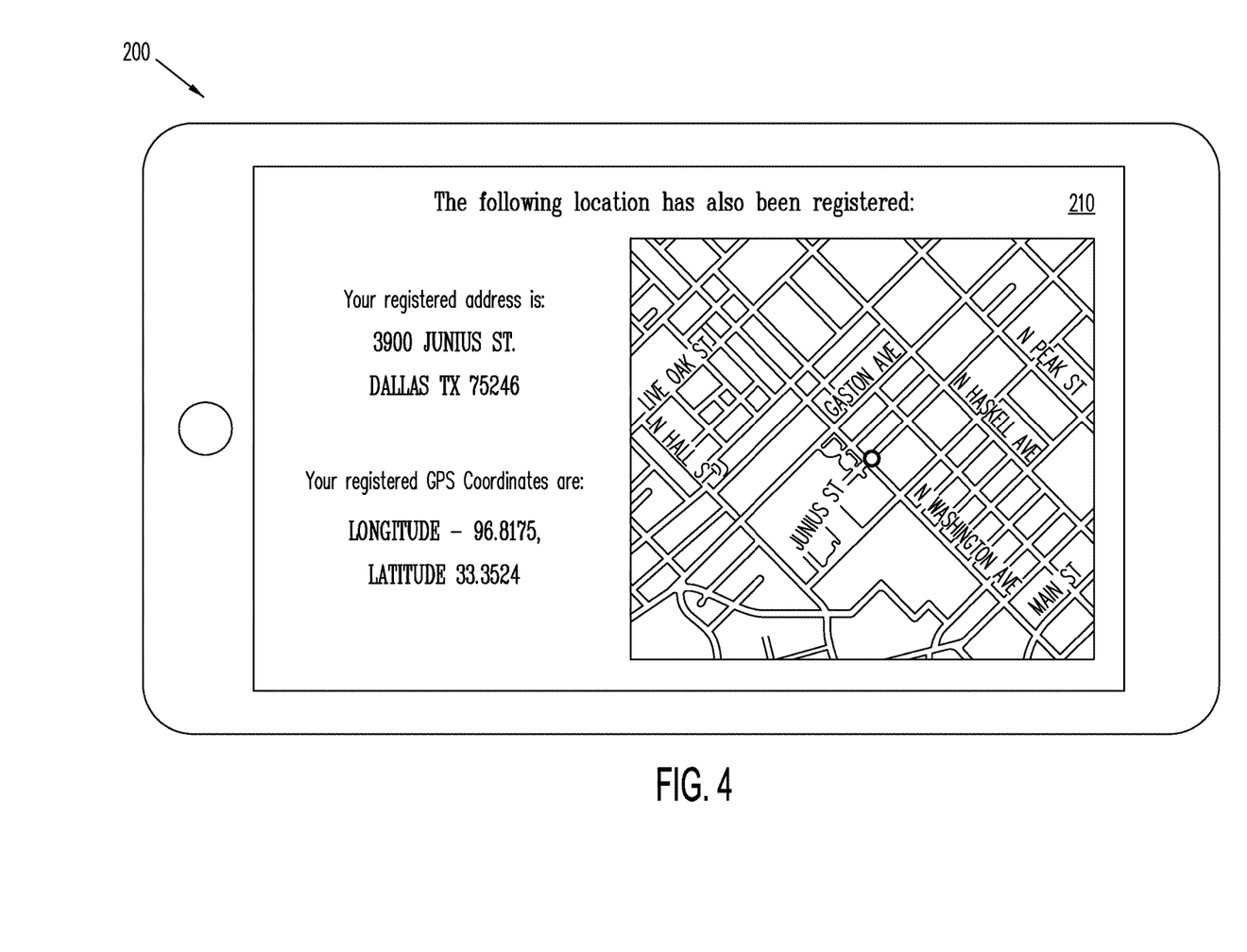

Referring now to FIG. 4, geo-location may also be a part of the device registration process. For example, the mobile electronic device 200 includes Global Positioning System (GPS) sensors. Once the user John Doe agrees to register the mobile electronic device 200, the payment provider app installed on the mobile electronic device 200 will acquire the GPS coordinates (e.g., longitude −96.8175, latitude 33.3524) of the present location of the electronic device 200. Based on the GPS coordinates, an address (e.g., 3900 Junius St., Dallas Tex., 75246) corresponding to the location may also be determined and displayed via the graphical user interface, along with the GPS coordinates and a map showing the registered location of the mobile electronic device 200. It is understood that although GPS has been used as an example for providing geo-location, other types of techniques may be employed to provide geo-location as well. For example, cellular network triangulation may be used to triangulate the location of the mobile electronic device 200. As another example, Wi-Fi networks or IP addresses may be used to determine the location of the mobile electronic device 200 as well.

Figure 5:
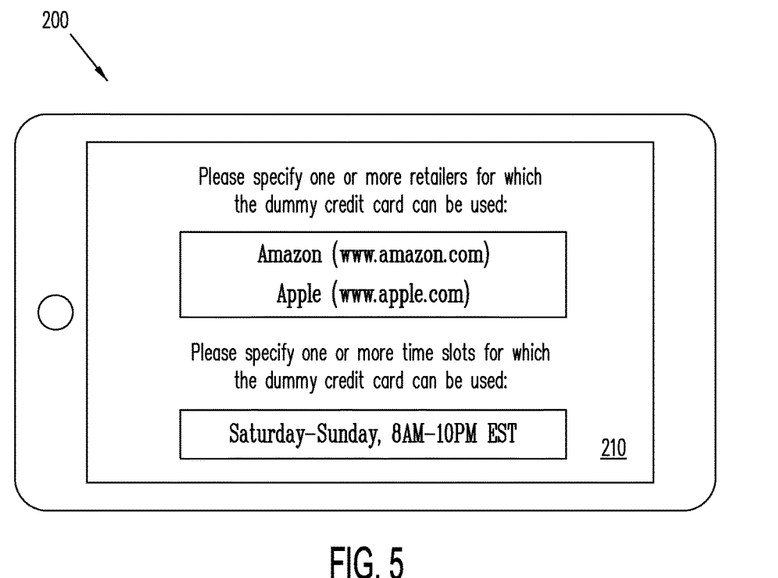

Referring now to FIG. 5, the user may also be allowed to specify an approved retailer and/or an approved time slot for which the mobile electronic device 200 can be used to conduct electronic online transactions using a dummy credit card. In the example shown in FIG. 5, the user John Doe has selected Amazon® (www.amazon.com) and Apple® (www.apple.com) as approved retailers for which the dummy credit card can be used to conduct legitimate transactions. The user has also specified that the dummy credit card can be used for the following time slots: Saturday through Sunday, 8 AM to 10 PM EST. As such, the dummy credit card number, once generated, can only be used for Amazon® or Apple®, and only during 8 AM to 10 PM on Saturdays and Sundays. Outside of those time slots and/or for another retailer other than Amazon® and Apple®, the dummy credit card will be denied. In some embodiments, after the denial of the dummy credit card, an electronic message (e.g., email or text) can be sent to the user informing the user of the denial of the dummy credit card, so that the user is aware that someone (could be himself) is using the dummy credit card in a manner that is not authorized. In some embodiments, after a certain number of denials, the dummy credit card is made to expire. At that point, the user would have to get a new dummy credit card if he wishes to continue using dummy credit cards.

As discussed above, more than one electronic device can be registered. According to some embodiments, every registered electronic device is tied to the same registered location, the same registered merchant, and the same registered time slot. In other embodiments, the user may be allowed to specify a different location, merchant, or time slot in association with each registered electronic device.

Once the registration process is completed, the user may be allowed to use a dummy credit card to conduct real transactions. As the name implies, the dummy credit card is not an actual credit card issued by a real bank. Rather, the dummy credit card contains numbers that are consistent in format with a real credit card—such as 16 numeric digits for VISA® or MASTERCARD®—so that it can be submitted to merchants in lieu of an actual or real credit card.

Figure 6:
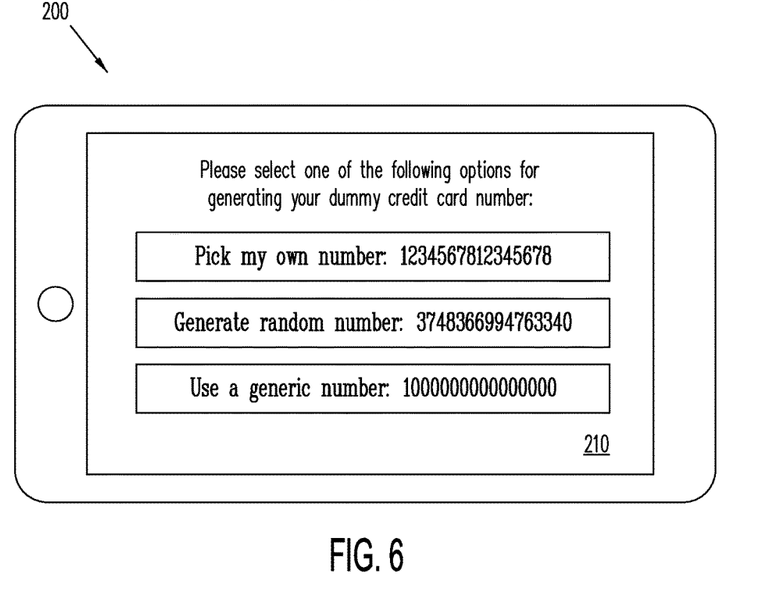

The number for the dummy credit card can be generated in various ways. For example, as shown in FIG. 6, the user may be allowed to pick his own dummy credit card number, which in this case is an easy-to-remember number 1234567812345678.

Alternatively, the user may choose to generate a random number. In that regards, the payment provider app may include a random number generator to generate the dummy credit card number randomly. As an example, the following Javascript code may be used to generate each of the digits of a 16-digit number consistent with a VISA® or MASTERCARD® credit card.

var randomnumber=Math.floor(Math.random( )*10)

where *10 dictates that a single digit will be randomly generated between 0-9. In other words, the above algorithm may be repeated 16 times to obtain 16 randomly generated digits. Alternatively, the random dummy credit card number may be generated as a single random number from 0-9999999999999999 by changing the variable in the code from *10 to *10000000000000000. The same algorithms can be used to generate dummy credit cards having other digit lengths (e.g., a dummy credit card consistent with the format of an AMERICAN EXPRESS® credit card, which has 15 digits).

Furthermore, the dummy credit card number can be a generic number, such as 1000000000000000 (the number 1 followed by 15 zeros). This dummy credit card number is generic in the sense that it can be used by a plurality (though not necessarily all) of the users of the payment provider. For example, the user John Doe and other users X, Y, and Z may all pick the generic number 1000000000000000 as their dummy credit card number. Thereafter, each of the users John Doe, X, Y, and Z may use the number 1000000000000000 as their dummy credit number when they conduct electronic online transactions. The fact that this 1000000000000000 number is not uniquely associated with a particular user will not prevent its use, as the payment provider will perform a lookup on the back end (discussed in more detail later) to determine whether it came from a legitimate user and device when the number is used.

It is understood that the user is not limited to only one dummy credit card number or only one particular method of dummy credit card generation. In some embodiments, the user may pick two or more dummy credit card numbers, which may be generated by different ways too. For example, the user may pick two of his own easy-to-remember credit card numbers 1234567812345678 and 1107197611071976 (e.g., a number correlated to his birth date), as well as a generic number 1000000000000000. The user may also select dummy credit card numbers corresponding to different credit cards, for example a 16-digit dummy credit card number corresponding to VISA® or MASTERCARD® and a 15-digit dummy credit card number corresponding to AMERICAN EXPRESS®.

It is also understood that other information associated with a credit card, such as an expiration date or a 3-digit or 4-digit Card Verification Value (CVV, also known as Card Security Code or CSC), may be generated in a similar manner as discussed above. For reasons of simplicity, however, the generation of the expiration date and the CVV is not specifically illustrated herein. In addition, in some embodiments, the payment provider app may inform the user that he can always use the current month and year for the expiration date when conducting a transaction, which is easy to remember. The payment provider app may also inform the user that he can use any number for the CVV, as it may be ignored when the payment provider eventually processes the transaction.

After the user selects one or more suitable dummy credit card numbers, the mobile electronic device 200 will (at least in part via the payment provider app) store the one or more user-selected dummy credit card numbers in a local memory storage of the mobile electronic device 200, or send them to be stored remotely on a server (e.g., server 170 in FIG. 1) of the payment provider. Regardless of the place of storage, the dummy credit card number is stored in association with the user's account with the payment provider, and as such it may be used to conduct real transactions online.

Figure 7:
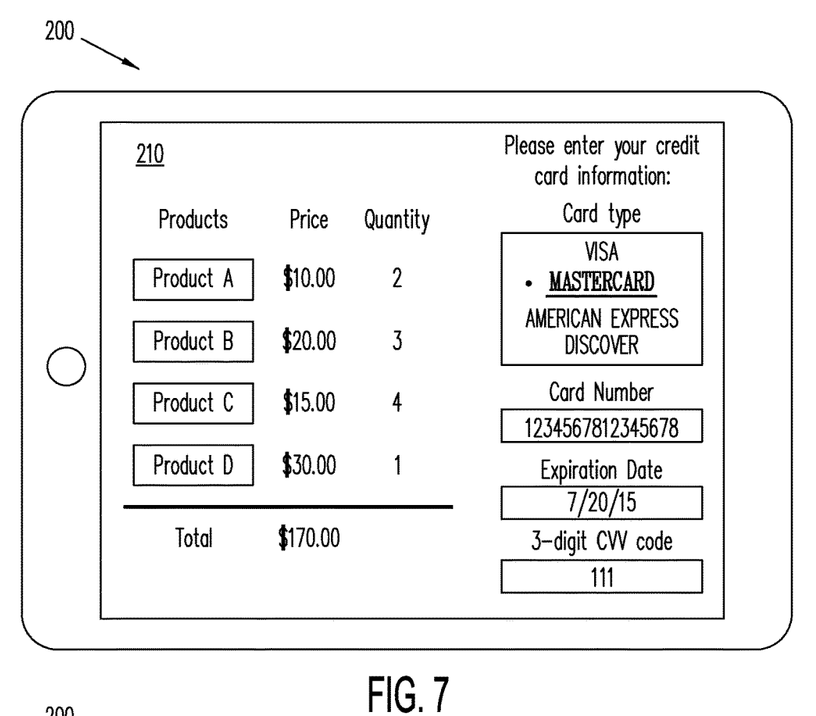

FIG. 7 illustrates an example check-out screen for an online transaction. The user John Doe has various quantities of products A, B, C, and D in an electronic shopping cart, totaling $170 dollars, and is ready to check out. He is prompted to enter his credit card information. As discussed above, the user may feel uncomfortable about giving his real credit card information to the online merchant for fear of it being stolen or otherwise compromised. Alternatively, the user may simply not have the credit card information memorized, which would then require him to go get the wallet and retrieve the real credit card. That is inconvenient for the user. Even after retrieval, the user may mis-enter credit card information, which may be much more likely with smaller keypads common in mobile devices, resulting in additional inconvenience (multiple entry attempts) and time delays.

However, as discussed above, since the user John Doe has already registered the mobile electronic device 200 (which is being used to conduct the transaction in this example), he is allowed to use a dummy or fake credit card to complete the transaction. As illustrated in FIG. 7, the user may select a credit card type (e.g., VISA®, MASTERCARD®, AMERICAN EXPRESS®, or DISCOVER®), and then put in the dummy credit card number. In this example, the user enters the dummy credit card number 1234567812345678, which was a number that the user chose for ease of remembering during the registration process. Of course, in other examples, the user may put in a randomly generated dummy credit card number (e.g., 3748366994763340) or a generic dummy credit card number (e.g., 1000000000000000). The user may also put in a suitable expiration date and a CVV code, which as discussed above may be generated in a similar manner as the dummy credit card number itself, or may be generic or meaningless.

When the dummy credit card information is submitted to the merchant, the merchant may send the information to the payment provider for processing on the back end. The payment provider may (e.g., via the payment provider app installed on the mobile electronic device 200) extract one or more device identifiers from the machine from which the request to conduct the transaction is sent, and compare that to the device identifier that was registered and associated with the user John Doe's account previously. In this case, the machine (the mobile electronic device 200) that is being used to send the transaction request is the same machine that was registered. Therefore, the extracted device identifier(s) in response to the transaction request should match up with the previously registered device identifiers. Again, these device identifiers may include a MAC address, a Bluetooth address, a UDID, a MEID, an IMEI, an ESN, an ICCID, an IMSI, etc. The matching device identifiers indicate that the device being used to conduct the transaction has been approved by the user (because it had already been registered). However, if the device identifiers fail to match up, that indicates that the device being used to conduct the online transaction is not the device that had been registered, which means that the user has not approved using the current device to make purchases. Accordingly, the payment provider may decline the request (sent by the current device) to conduct the transaction. Alternatively, the user may receive a request to register the current device (such as discussed above) and obtain a subsequent approval of the payment request.

Assuming the device identifiers do match up, the payment provider then looks up the dummy credit card number that had been registered in association with this device and compares that to the dummy credit card number that has been forwarded to the payment provider by the merchant. If these dummy credit card numbers match up, the payment provider may then approve the transaction and process it accordingly. For example, the payment provider may draw funds from an account that the user John Doe has with the payment provider and use these funds to pay for the transaction. Alternatively, the payment provider may also have linked a real credit card (supplied by the user John Doe) with the dummy credit card, in which case the payment provider may process the transaction by charging the amount owed to the real credit card linked with the dummy credit card.

If these dummy credit card numbers fail to match up, the payment provider may decline the request to conduct the transaction, even though the transaction request came from a registered device. In this manner described above, the user may use a dummy credit card number to conduct a real or legitimate transaction electronically.

In embodiments where the device registration process includes geo-location, the payment provider may also use the GPS sensors of the machine (the machine from which the transaction request is sent) to determine the location (e.g., GPS coordinates) thereof. The payment provider compares this extracted location of the machine making the transaction request with the location that had been registered previously. Again, the payment provider processes the transaction request only if the two locations match up. Similarly, if the user had specified an approved retailer/merchant and/or time slot, the payment provider may determine merchant involved in the transaction request and/or the present time and compare them to the registered merchant and/or time slot. If either one fails to match up, then the payment provider may decline the transaction. In the example illustrated in FIG. 5, the user John Doe had registered Amazon® and Apple® as approved merchants and registered the time slot of Saturday-Sunday between 8 AM-10 PM EST as approved time slots. In that case, if the present transaction is made at Walmart.com (or any merchant other than Amazon® and Apple®), or if the transaction is made at 1 PM EST on a Wednesday (or any time slot outside of Saturday-Sunday between 8 AM-10 PM EST), the payment provider will decline the transaction. In some embodiments, these additional security features (e.g., restrictions based on time, location, etc.) can be selectively turned on or off by the payment provider as a way to balance potential fraud with customer convenience.

By providing dummy credit card numbers that can be used just like a real credit card, the present disclosure enhances the security of electronic online transactions. The users no longer need to worry about having their real credit card information intercepted or stolen when purchasing items online. It is also convenient for the users to not have to memorize their real credit card information. In various embodiments, the dummy credit card numbers are either picked by the user (and thus can presumably be easily recalled by the user), or they are easy-to-remember generic numbers.

In addition, by limiting electronic transactions to a particular device (and possibly to an exact location, a certain merchant, and at a specific time period), the present disclosure enhances the security of the electronic transaction. For example, the user may know that the only time that he does online shopping is when he uses his iPad® (device-specific) at home (location-specific), and on the weekends between 8 AM to 10 PM EST (time-specific), and the user only shops at Amazon's or Apple's online sites (merchant-specific). Once the user stipulates these parameters/restrictions by completing a registration process with the payment provider, the transaction with the dummy credit card can only be conducted when each of the above parameters are met, because anything outside of these parameters raises suspicion as to who is actually making the purchase.

In the present example, if the dummy credit card was registered to an iPad®, but the actual transaction request came from a device that is an Android® phone (e.g., by evaluating a suitable device identifier), it raises a red flag (or indicates a possible security risk) that the user may not be the one who is trying to make the purchase. Similarly, if the dummy credit card was registered to be usable only at the user's home, but the actual transaction request came from an office building (e.g., by pulling the GPS coordinates), that also raises a red flag as to who is actually requesting the transaction. Similarly, the restrictions with respect to the particular merchant and/or time of the day, if violated, also raise red flags as to whether the user himself/herself is behind the transaction request.

In some embodiments, if one or more of these parameters regarding device, location, merchant, or time slot are not met, the payment provider may then institute an authentication process (also referred to as a two-step authentication) instead of rejecting the transaction. The authentication process is designed to prove that the person making the transaction request is indeed the user, even though red flags have been raised. In some embodiments, the authentication process may include the payment provider sending a secret code to a mobile telephone or an email address of the user, which had been linked to the user's account with the payment provider. The user must retrieve that secret code and submit it back to the payment provider to prove that he/she is the person requesting to conduct the electronic transaction. In other embodiments, the authentication process may include a biometric verification process, such as a fingerprint scan, a retina scan, a voice recording, a facial image recognition, etc. Regardless of how the authentication process is implemented, once the user passes it, the payment provider may still allow the transaction to go through using the dummy credit card numbers in these embodiments.

Although the embodiments of the present disclosure discussed above are directed to using a registered device to conduct transactions via dummy credit card numbers, such a registered device is not required in other embodiments. For example, suppose that the user has never registered an electronic device. At a checkout screen such as the one shown in FIG. 7, the user may open a web browser (or a different tab in the same browser) and navigate to a web site of the payment provider. Alternatively, the user may open the payment provider app on the electronic device 200. The result is shown in FIG. 8 as an example.

Figure 8:
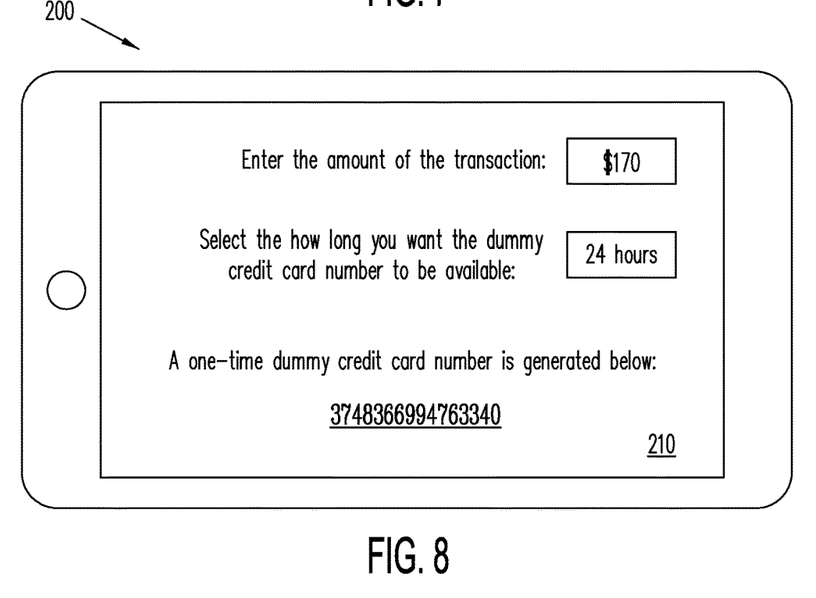

Referring to FIG. 8, the user may request the payment provider to generate a one-time dummy credit card number. The user specifies the amount of the transaction ($170 in this example) and how long he wishes the dummy credit card number to be available (24 hours in this example). In some embodiments, instead of having the user specify an amount of time for which the dummy credit card number will be available, the payment provider automatically sets an expiration period (e.g., expires in 30 minutes, 1 hour, or 2 hours, etc.) for the dummy credit card number and informs the user as such, The payment provider then generates a one-time dummy credit card number that is 374836699473340 in this example. Of course, the user may also be allowed to pick his own dummy credit card number or be prompted to use a generic one credit card number similar to those discussed above with reference to FIG. 6. In any case, the user may then use this dummy credit card number to complete the transaction shown in FIG. 7. However, if the transaction amount is other than $170, and/or if the user waits for more than 24 hours before using it, the dummy credit card number will not work, as the payment provider will reject the transaction in that case.

It is understood that the two-step authentication process may also be implemented in conjunction with this embodiment corresponding to FIG. 8. In other words, the user may be required to pass the authentication process before being allowed to use the one-time dummy credit card to conduct purchases.

Though the embodiment of FIG. 8 does not necessarily offer the same transactional security discussed above in association with the embodiments utilizing a registration process to narrow down how, where, when, and with whom an online transaction can be conducted, the embodiment of FIG. 8 still offers the users the convenience of not having to memorize a real credit card number as well as the peace of mind of not having to submit a real credit card number. As such, the embodiment of FIG. 8 still offers advantages over conventional electronic transactions where a real credit card is required.

Figure 9:
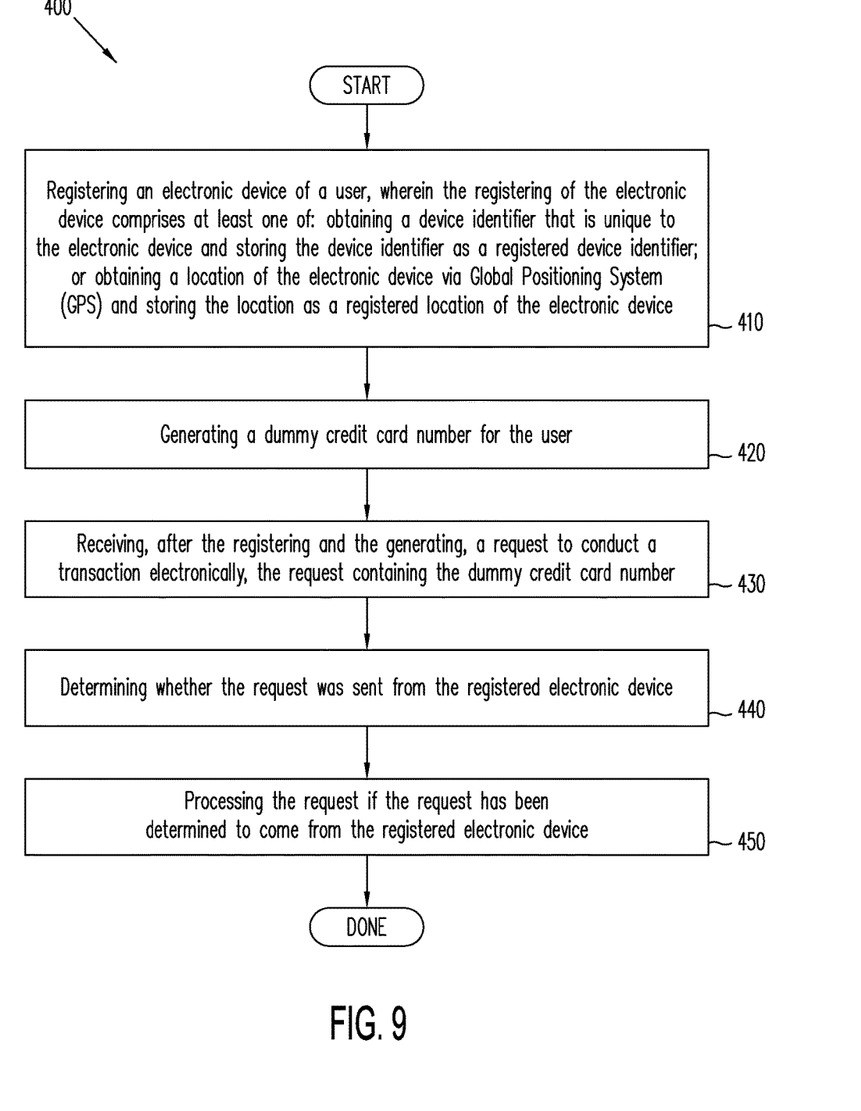
FIG. 9 is a flowchart illustrating a method of enhancing electronic information security according to an embodiment of the present disclosure.

FIG. 9 is a flowchart illustrating a method 400 of enhancing electronic information security. The method 400 includes a step 410 of registering an electronic device of a user. The registering of the electronic device comprises at least one of: obtaining a device identifier that is unique to the electronic device and storing the device identifier as a registered device identifier; or obtaining a location of the electronic device via Global Positioning System (GPS) and storing the location as a registered location of the electronic device.

The method 400 includes a step 420 of generating a dummy credit card number for the user. In some embodiments, the generating of the dummy credit card number comprises storing a user-specified number as the dummy credit card number. In some embodiments, the generating of the dummy credit card number comprises storing a randomly generated number as the dummy credit card number. In some embodiments, the generating of the dummy credit card number comprises communicating, to a plurality of users including the user, a generic number is to be used as the dummy credit card number for each of the plurality of the users.

The method 400 includes a step 430 of receiving, after the registering and the generating, a request to conduct a transaction electronically, the request containing the dummy credit card number.

The method 400 includes a step 440 of determining whether the request was sent from the registered electronic device. In some embodiments, the determining comprises: extracting a device identifier from a machine that actually sent the request; and concluding that the request was sent from the registered electronic device if the device identifier extracted from the machine matches the registered device identifier. In some other embodiments, the determining comprises: extracting a location of a machine that actually sent the request; and concluding that the request was sent from the registered electronic device if the location extracted from the machine matches the registered location.

The method 400 includes a step 450 of processing the request if the request has been determined to come from the registered electronic device.

In some embodiments, the step 410 of registering further comprises associating a user-specified time slot with the electronic device, and the step 450 of processing the request is performed only if the request is sent at a time that falls within the user-specified time slot. In some embodiments, the step 410 of registering further comprises associating a user-specified retailer with the electronic device, and the step 450 of processing the request is performed only if the request includes a purchasing transaction involving the user-specified retailer.

It is understood that at least some of the steps 410-450 are performed at least in part by one or more electronic processors of a system that is located remotely from the electronic device, or at least in part by an app installed on the electronic device. It is also understood that additional method steps may be performed before, during, or after the steps 410-450 discussed above. For example, in some embodiments, the method 400 further includes a step of authenticating an identity of a person sending the request to conduct the transaction. The authenticating step may include a biometric identification process or a step of asking the person to verify a secret code. The processing of the request is performed only if the person has been successfully authenticated. It is also understood that one or more of the steps of the method 400 described herein may be omitted, combined, or performed in a different sequence as desired.

The present disclosure offers various advantages over conventional tokenization schemes. It is understood, however, that not all advantages are necessarily disclosed herein, different embodiments may offer different advantages, and that no particular advantage is required for all embodiments.

One advantage is that the use of a dummy credit card number to conduct real transactions reduces likelihood of fraud and enhances electronic information security. In case the dummy credit card number is intercepted by a hacker, it has no effect on the real credit card information of the user. In other words, since the hacker does not have the user's real credit card information, the user need not cancel the real credit card and apply for new credit cards. Consequently, the user can have more peace of mind about conducting electronic online transactions using the dummy credit card numbers. In addition, since the dummy credit card numbers may be specified by the user or may be generic, the user may easily remember the dummy credit card number, which is convenient. In addition, the registration process restricts the transactions to a specific machine, location, retailer, and/or time slot. These restrictions, when violated, raise red flags, which in turn may prevent suspicious transaction from being conducted. If the user still wishes to proceed despite one or more of the restrictions being violated, a two-step authentication process is offered to let the user prove "who he/she really is." The transaction may still be processed upon a successful authentication of the user. In doing so, the present disclosure offers improved transaction security while maintaining flexibility. As yet another advantage, the implementation of the various aspects of the present disclosure requires no changes to how merchants operate. As far as the merchants are concerned, the dummy credit card numbers may as well be a legitimate real credit card number. For example, a merchant that accepts American Express cards would be able to accept payments made with a dummy credit card that conforms with the format of the American Express credit cards.

Figure 10:
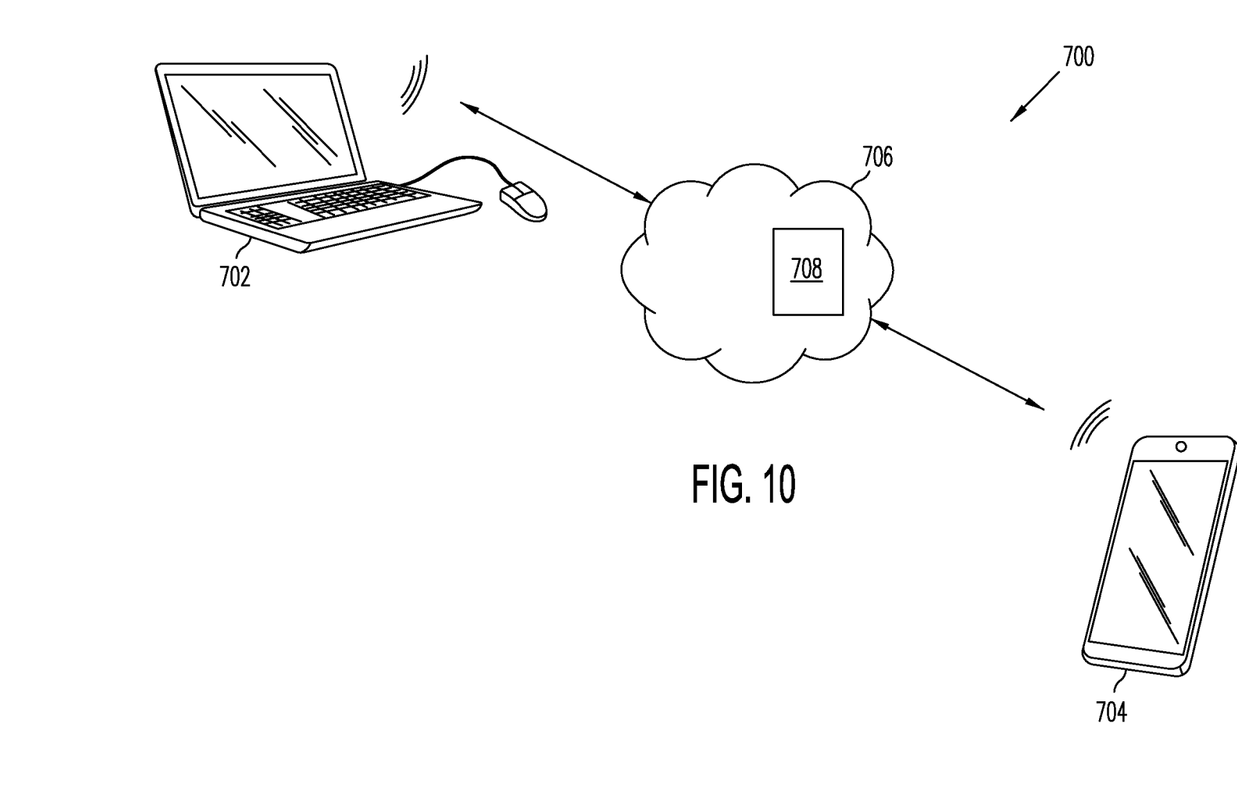
FIG. 10 is a diagram illustrating an example cloud computing architecture according to embodiments of the present disclosure.

FIG. 10 illustrates an example cloud-based computing architecture 700, which may also be used to implement various aspects of the present disclosure. The cloud-based computing architecture 700 includes a mobile device 704 and a computer 702, both connected to a computer network 706 (e.g., the Internet or an intranet). In one example, a consumer has the mobile device 704, which is configured to access identity platforms and initiate purchasing transactions therethrough.

The mobile device 704 is in communication with cloud-based resources 708, which may include one or more computers, such as server computers, with adequate memory resources to handle requests from a variety of users. A given embodiment may divide up the functionality between the mobile device 704 and the cloud-based resources 708 in any appropriate manner. For example, an app on mobile device 704 may perform basic input/output interactions with the user, but a majority of the processing and caching may be performed by the cloud-based resources 708. However, other divisions of responsibility are also possible in various embodiments.

The cloud-based computing architecture 700 also includes the personal computer 702 in communication with the cloud-based resources 708. In one example, a participating merchant or consumer/user may access information from the cloud-based resources 708 by logging on to a merchant account or a user account at computer 702.

It is understood that the various components of cloud-based computing architecture 700 are shown as examples only. For instance, a given user may access the cloud-based resources 708 by a number of devices, not all of the devices being mobile devices. Similarly, a merchant or another user may access resources 708 from any number of suitable mobile or non-mobile devices. Furthermore, the cloud-based resources 708 may accommodate many merchants and users in various embodiments.

Figure 11:
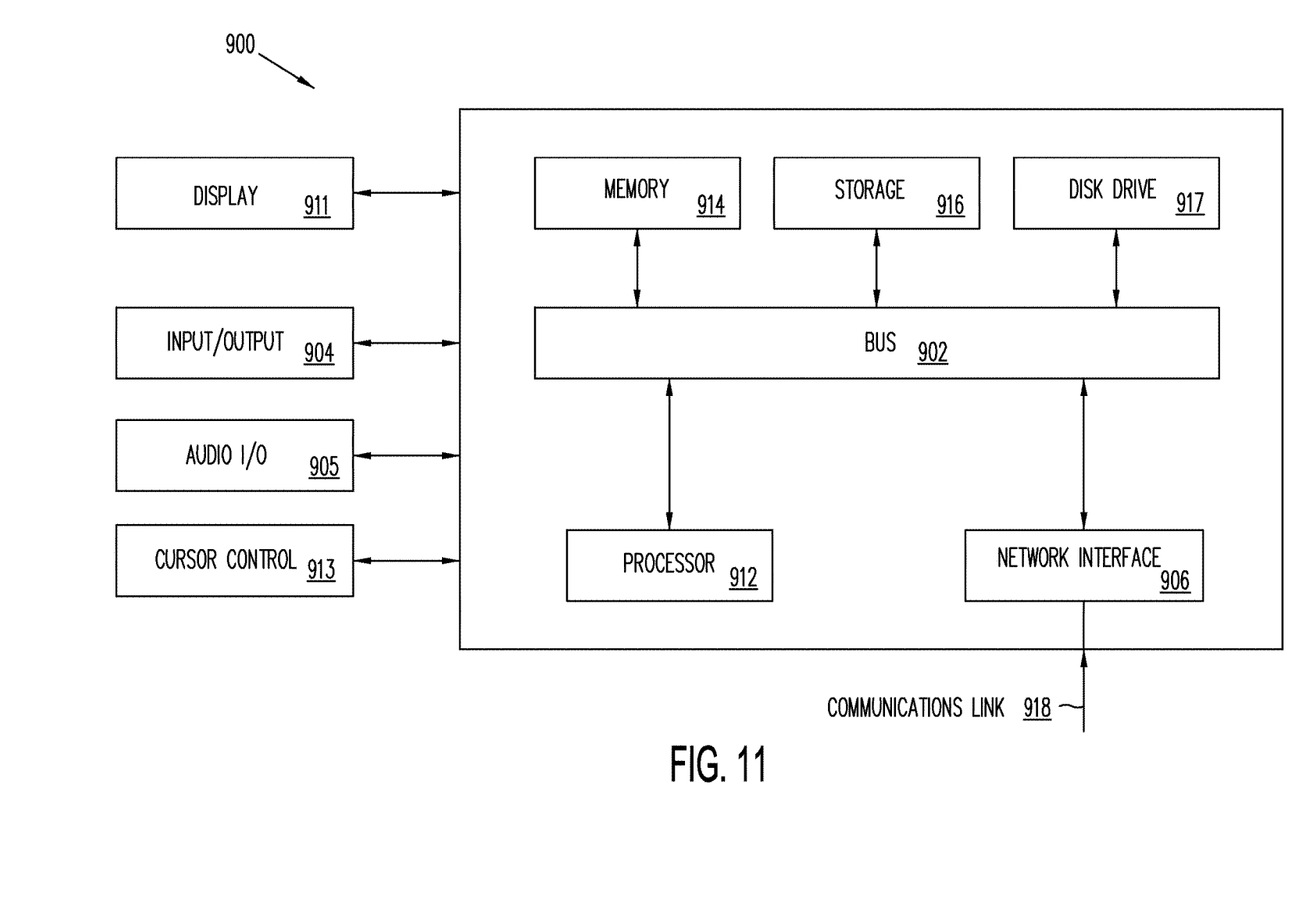
FIG. 11 is a block diagram of a computer system suitable for implementing one or more components in FIG. 1 according to embodiments of the present disclosure.

FIG. 11 is a block diagram of a computer system 900 suitable for implementing one or more embodiments of the present disclosure. In various implementations, the user device may comprise a personal computing device (e.g., smart phone, a computing tablet, a personal computer, laptop, wearable device, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 900 in a manner as follows.

Computer system 900 includes a bus 902 or other communication mechanism for communicating information data, signals, and information between various components of computer system 900. Components include an input/output (I/O) component 904 that processes a user action, such as selecting keys from a keypad/keyboard, selecting one or more buttons or links, etc., and sends a corresponding signal to bus 902. I/O component 904 may also include an output component, such as a display 911 and a cursor control 913 (such as a keyboard, keypad, mouse, etc.). An optional audio input/output component 905 may also be included to allow a user to use voice for inputting information by converting audio signals. Audio I/O component 905 may allow the user to hear audio. A transceiver or network interface 906 transmits and receives signals between computer system 900 and other devices, such as another user device, a merchant server, or a payment provider server via network 360. In one embodiment, the transmission is wireless, although other transmission mediums and methods may also be suitable. A processor 912, which can be a microcontroller, digital signal processor (DSP), or other processing component, processes these various signals, such as for display on computer system 900 or transmission to other devices via a communication link 918. Processor 912 may also control transmission of information, such as cookies or IP addresses, to other devices.

Components of computer system 900 also include a system memory component 914 (e.g., RAM), a static storage component 916 (e.g., ROM), and/or a disk drive 917. Computer system 900 performs specific operations by processor 912 and other components by executing one or more sequences of instructions contained in system memory component 914. Logic may be encoded in a computer readable medium, which may refer to any medium that participates in providing instructions to processor 912 for execution. Such a medium may take many forms, including but not limited to, non-volatile media, volatile media, and transmission media. In various implementations, non-volatile media includes optical or magnetic disks, volatile media includes dynamic memory, such as system memory component 914, and transmission media includes coaxial cables, copper wire, and fiber optics, including wires that comprise bus 902. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 900. In various other embodiments of the present disclosure, a plurality of computer systems 900 coupled by communication link 918 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

One aspect of the present disclosure involves a system of enhancing electronic information security. The system includes an electronic memory storing programing instructions; and one or more electronic processors in communication with the electronic memory. The one or more electronic processors are configured to execute the programming instructions to perform the following steps: accessing an account associated with an electronic device of a user, wherein the accessing comprises at least one of: retrieving a first device identifier that is unique to the electronic device obtained during a registration of the electronic device; or retrieving a first location of the electronic device via Global Positioning System (GPS) obtained during the registration of the electronic device; generating a dummy credit card number for the user; receiving, after the registering and the generating, a request to conduct a transaction electronically, the request containing the dummy credit card number; determining whether the request was sent from the registered electronic device; and processing the request if the request has been determined to come from the registered electronic device.

Another aspect of the present disclosure involves a method of enhancing electronic information security. The method includes: accessing an account associated with an electronic device of a user, wherein the accessing comprises at least one of: retrieving a first device identifier that is unique to the electronic device obtained during a registration of the electronic device; or retrieving a first location of the electronic device via Global Positioning System (GPS) obtained during the registration of the electronic device; generating a dummy credit card number for the user; receiving, after the registering and the generating, a request to conduct a transaction electronically, the request containing the dummy credit card number; determining whether the request was sent from the registered electronic device; and processing the request if the request has been determined to come from the registered electronic device.

Yet another aspect of the present disclosure involves a non-transitory computer-readable medium comprising instructions which, in response to execution by a computer system, cause the computer system to perform a method comprising the following steps: accessing an account associated with an electronic device of a user, wherein the accessing comprises at least one of: retrieving a first device identifier that is unique to the electronic device obtained during a registration of the electronic device; retrieving a first location of the electronic device via Global Positioning System (GPS) obtained during the registration of the electronic device; associating a user-specified time slot with the electronic device; or associating a user-specified retailer with the electronic device; generating a dummy credit card number for the user, wherein the generating of the dummy credit card number comprises one of: storing a user-specified number as the dummy credit card number, storing a randomly generated number as the dummy credit card number, or assigning a generic number to be used as the dummy credit card number; receiving, after the accessing and the generating, a request from a machine to conduct a transaction electronically, the request containing the dummy credit card number; extracting information from the machine; and processing the request only if the following conditions are met based on the information extracted from the machine: a second device identifier extracted from the machine matches the first device identifier; a second location extracted from the machine matches the first location; the request is sent at a time that falls within the user-specified time slot; and the request includes a purchasing transaction involving the user-specified retailer.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system of enhancing electronic information security, the system comprising:
    a non-transitory memory storing instructions; and
    one or more hardware processors coupled to the non-transitory memory and configured to read instructions from the non-transitory memory to cause the system to perform operations comprising:
    accessing an account associated with an electronic device of a user, wherein the accessing comprises at least one of:
        retrieving a first device identifier that is unique to the electronic device obtained during a registration of the electronic device; or
        retrieving a first location of the electronic device via Global Positioning System (GPS) obtained during the registration of the electronic device;
    generating a dummy credit card number for the user;
    communicating the dummy credit card number to the registered electronic device;
    receiving, after the accessing, the generating, and the communicating, a request to conduct a transaction electronically, the request containing the dummy credit card number;
    determining whether the request was sent from the registered electronic device, wherein the determining comprises:
        in response to the retrieving the first device identifier, extracting a second device identifier from a machine that sent the request and matching the second device identifier with the first device identifier; or
        in response to the retrieving the first location, extracting a second location from the machine that sent the request and matching the second location with the first location; and
    processing the request if the request has been determined to come from the registered electronic device.

2. The system of claim 1, wherein the extracting the second device identifier further comprise: extracting, from the machine that sent the request, a Media Access Control (MAC) address, a Bluetooth address, a serial number, or an International Mobile Station Equipment Identity (IMEI) as the second device identifier.

3. The system of claim 1, wherein the extracting the second location further comprise: extracting, from the machine that sent the request, a geographical location of the machine as the second location, wherein the extracting the geographical location is performed using GPS coordinates of the machine or a cellular network triangulation of the machine.

4. The system of claim 1, wherein:
    the registration of the electronic device associates a user-specified time slot with the electronic device; and
    the processing of the request is performed when the request is sent at a time that falls within the user-specified time slot.

5. The system of claim 1, wherein:
    the registration of the electronic device associates a user-specified retailer with the electronic device; and
    the processing of the request is performed when the request includes a purchasing transaction involving the user-specified retailer.

6. The system of claim 1, wherein the generating of the dummy credit card number comprises storing a user-specified number as the dummy credit card number.

7. The system of claim 1, wherein the generating of the dummy credit card number comprises storing a randomly generated number as the dummy credit card number.

8. The system of claim 1, wherein the generating of the dummy credit card number comprises communicating, to a plurality of users including the user, a generic number is to be used as the dummy credit card number for each of the plurality of the users.

9. The system of claim 1, wherein the operations further comprise: authenticating an identity of a person sending the request to conduct the transaction, the authenticating including a biometric identification process or asking the person to verify a secret code, wherein the processing of the request is performed only if the person has been successfully authenticated.

10. A method of enhancing electronic information security, comprising:
    accessing an account associated with an electronic device of a user, wherein the accessing comprises at least one of:
        retrieving a first device identifier that is unique to the electronic device obtained during a registration of the electronic device; or
        retrieving a first location of the electronic device via Global Positioning System (GPS) obtained during the registration of the electronic device;
    generating a dummy credit card number for the user;
    communicating the dummy credit card number to the user;
    receiving, after the accessing, the generating, and the communicating, a request to conduct a transaction electronically, the request containing the dummy credit card number;
    determining whether the request was sent from the registered electronic device, wherein the determining comprises:
        in response to the retrieving the first device identifier, extracting a second device identifier from a machine that sent the request and matching the second device identifier with the first device identifier; or
        in response to the retrieving the first location, extracting a second location from the machine that sent the request and matching the second location with the first location; and
    processing the request if the request has been determined to come from the registered electronic device.

11. The method of claim 10, wherein the extracting the second device identifier further comprise: extracting, from the machine that sent the request, a Media Access Control (MAC) address, a Bluetooth address, a serial number, or an International Mobile Station Equipment Identity (IMEI) as the second device identifier.

12. The method of claim 10, wherein the extracting the second location further comprise: extracting, from the machine that sent the request, a geographical location of the machine as the second location, wherein the extracting the geographical location is performed using GPS coordinates of the machine or a cellular network triangulation of the machine.

13. The method of claim 10, further comprising: associating a user-specified time slot with the electronic device, wherein the processing of the request is performed when the request is sent at a time that falls within the user-specified time slot.

14. The method of claim 10, further comprising: associating a user-specified retailer with the electronic device, wherein the processing of the request is performed when the request includes a purchasing transaction involving the user-specified retailer.

15. The method of claim 10, wherein the generating of the dummy credit card number comprises storing a user-specified number as the dummy credit card number.

16. The method of claim 10, wherein the generating of the dummy credit card number comprises storing a randomly generated number as the dummy credit card number.

17. The method of claim 10, wherein the generating of the dummy credit card number comprises communicating, to a plurality of users including the user, a generic number is to be used as the dummy credit card number for each of the plurality of the users.

18. The method of claim 10, further comprising: authenticating an identity of a person sending the request to conduct the transaction, the authenticating including a biometric identification process or asking the person to verify a secret code, wherein the processing of the request is performed only if the person has been successfully authenticated.

19. A non-transitory computer-readable medium having stored thereon machine-readable instructions executable to cause a system to perform operations comprising:
 accessing an account associated with an electronic device of a user, wherein the accessing comprises at least one of:
  retrieving a first device identifier that is unique to the electronic device obtained during a registration of the electronic device;
  retrieving a first location of the electronic device via Global Positioning System (GPS) obtained during the registration of the electronic device;
  associating a user-specified time slot with the electronic device; or
  associating a user-specified retailer with the electronic device;
 generating a dummy credit card number for the user, wherein the generating of the dummy credit card number comprises one of: storing a user-specified number as the dummy credit card number, storing a randomly generated number as the dummy credit card number, or assigning a generic number to be used as the dummy credit card number;
 communicating the dummy credit card number to the user;
 receiving, after the accessing, the generating, and the communicating, a request from a machine to conduct a transaction electronically, the request containing the dummy credit card number;
 extracting information from the machine; and
 processing the request when the following conditions are met based on the information extracted from the machine:
  a second device identifier extracted from the machine matches the first device identifier;
  a second location extracted from the machine matches the first location;
  the request is sent at a time that falls within the user-specified time slot; and
  the request includes a purchasing transaction involving the user-specified retailer.

20. The non-transitory computer-readable medium of claim 19, wherein the operations further comprise authenticating an identity of a person sending the request to conduct the transaction, the authenticating including a biometric identification process or asking the person to verify a secret code, wherein the processing of the request is performed only after the person has been successfully authenticated.

* * * * *